April 5, 1960 H. M. REEVES ET AL 2,931,575
CONTROLS FOR BROILERS
Filed March 26, 1956 3 Sheets-Sheet 1

Inventors
Herbert M. Reeves
Earl D. Hillebrand
by Carlson, Pitzner, Hubbard & Wolfe
Attorneys April 5, 1960  H. M. REEVES ET AL  2,931,575
CONTROLS FOR BROILERS
Filed March 26, 1956  3 Sheets-Sheet 2

Inventors
Herbert M. Reeves
Earl D. Hillebrand
By Carlson, Pitzner, Hubbard & Wolfe
Attorneys April 5, 1960 H. M. REEVES ET AL 2,931,575
CONTROLS FOR BROILERS
Filed March 26, 1956 3 Sheets-Sheet 3
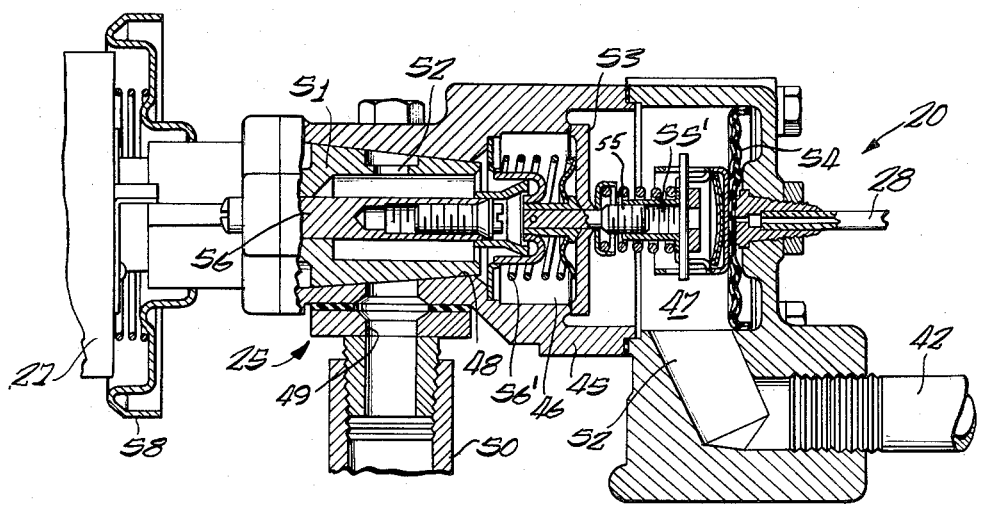
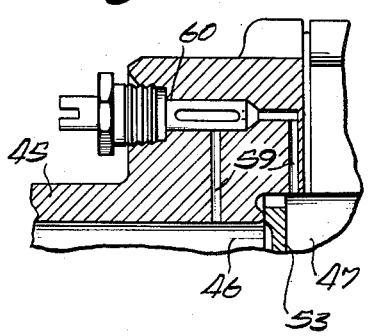
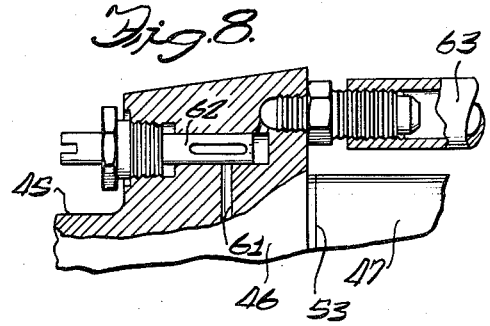
Inventors
Herbert M. Reeves
Earl D. Hillebrand
By Carlson, Pitzner, Hubbard & Wolfe
Attorneys United States Patent Office 2,931,575
Patented Apr. 5, 1960

2,931,575

CONTROLS FOR BROILERS

Herbert M. Reeves and Earl D. Hillebrand, Kankakee, Ill., assignors to Geo. D. Roper Corporation Application March 26, 1956, Serial No. 573,664

3 Claims. (Cl. 236—15)

The invention relates to apparatus for broiling meat and comparable food stuffs, and more particularly, to improved controls for such apparatus.

In the cooking operation commonly known as broiling, food is cooked by subjecting it to heat radiated from a heat source located at some distance from and usually above the food. While the heat source and food are ordinarily confined within a chamber or broiling oven, the cooking action results from the radiated heat rather than from the ambient heat of the oven. Different foods, of course, require different heat intensities for proper broiling. Since heat intensity in the broiling zone is a function of both the heat output of the heat source and the spacing of the food from the source, uniform results are hard to attain and it is almost impossible to prepare adequate instructions to guide a cook or housewife in the use of the broiler.

One object of the invention is to provide means for controlling the intensity of the heat radiated to the food stuff so that optimum temperature conditions may be established and maintained for properly broiling a wide variety of food stuffs, and which allow substantial variation in the spacing of the food from the heat source without adverse affect on the broiling action.

Another object is to provide controls for regulating the heat output of a broiler heat source in a manner such that it may be preset to establish and maintain predetermined conditions suitable for broiling a wide variety of foods.

Still another object is to provide control means effective to prevent excessive temperatures in the broiling oven in case the burner is inadvertently left in operation after the food is removed from the oven.

A more specific object is to provide controls which enable a cook or housewife to preadjust the broiler from simple opertaing instructions which insure a maintenance of the proper heat intensity on the food stuff regardless of its spacing from the heat source.

A further object is to provide controls for a broiler embodying temperature responsive means located relative to the food and shielded from the heat source of the broiler so as to respond to the temperature in the broiling zone through reflection and convection of heat from the food itself.

It is also an object of the invention to provide an automatic temperature control for broilers which is simple in construction, which utilizes standard, commercial available themostatic control elements, which can be manufactured economically and which is durable and requires a minimum of care and maintenance.

Other objects and advantages of the invention will become apparent from the following detailed description of the preferred embodiment illustrated in the accompanying drawings in which:

Fig. 6 is an enlarged longitudinal sectional view taken in a vertical plane substantially along the 6—6 of Fig. 2 showing details of control valve for regulating the heat output of the heat source or burner.

Fig. 7 is a fragmentary sectional view of the control valve showing details of the by-pass duct and valve.

Fig. 8 is a fragmentary perspective of the control valve showing details of the pilot circuit and valve.

Figure 1:
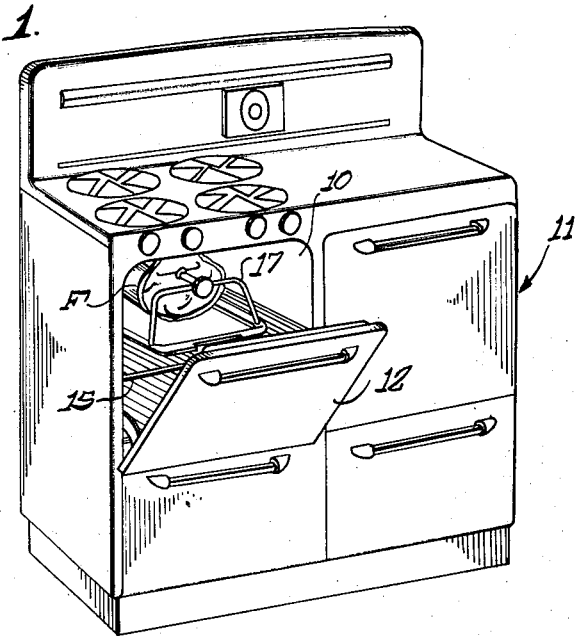
Fig. 1 is a perspective view of a conventional gas range having a broiling oven equipped with controls embodying the features of the invention.

While a preferred form of the invention has been shown and will be described herein in detail, it is to be understood that this is not intended to limit the invention to the particular structure shown, but the intention is to cover all modifications and adaptations falling within the spirit and scope of the invention as expressed in the appended claims.

By way of illustration, the invention has been shown as incorporated in the broiler oven 10 of a gas range 11. The broiler oven, which is adapted to be closed by a hinged door 12, is equipped with a suitable heat source 13, in this instance a gas burner 14, mounted in the upper portion of the oven and positioned to radiate heat downwardly. It will be understood, of course, that the invention is applicable to ovens in which the heat source 13 is in the form of an electrical heating element.

Figure 2:
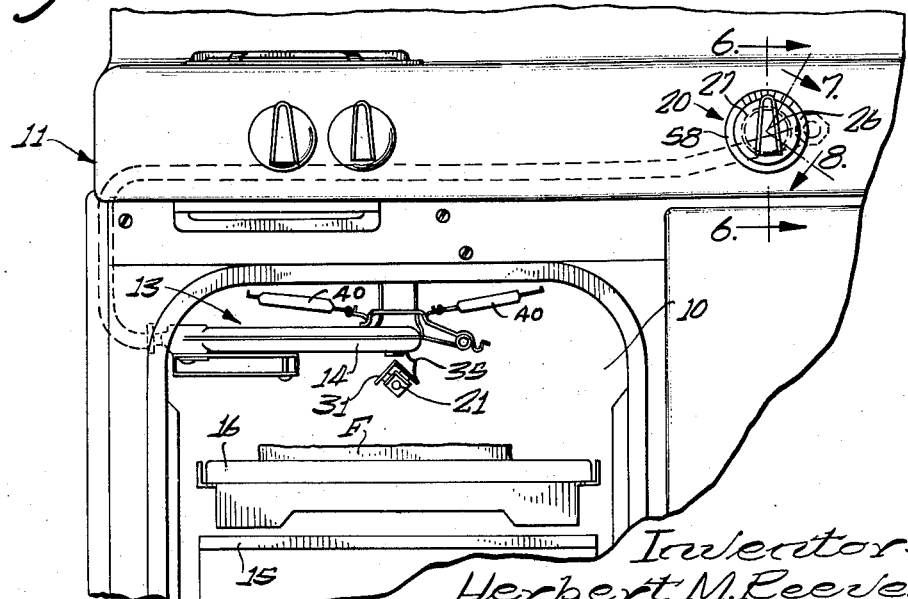
Fig. 2 is a fragmentary front elevational view of the range and broiling oven shown in Fig. 1.
Figure 3:
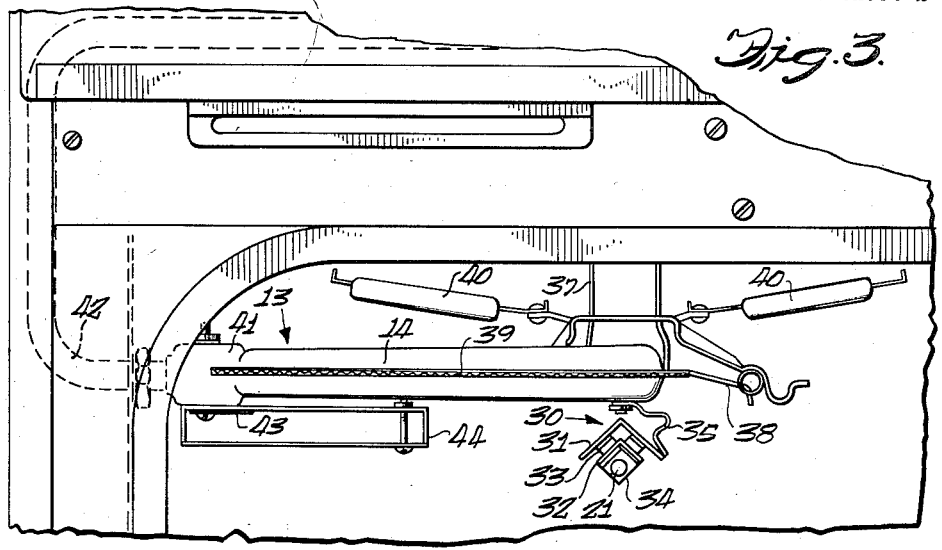
Fig. 3 is a fragmentary front elevational view on a somewhat enlarged scale showing the upper portion of the broiling oven and the elements of the broiler.
Figure 4:
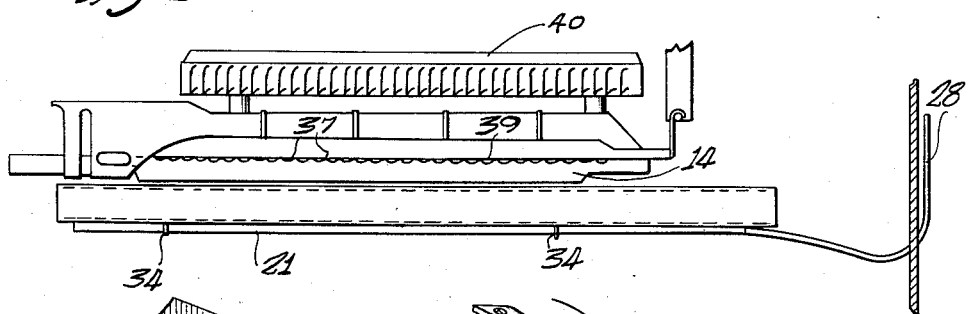
Fig. 4 is a fragmentary side elevational view of the burner and temperature sensing element assembly.

For supporting food, to be cooked, the broiler oven is fitted with a suitable rack 15 located below the burner 14, adjustable vertically toward and from the burner in any preferred manner. The rack 15 may carry a conventional tray or broiler pan 16 (Fig. 2) or a rotary spit device 17 (Fig. 1) for holding the food as desired.

In carrying out the invention, provision is made for automatically varying the heat output of the heat source 13 to establish and maintain the heat intensity in the broiling zone at a substantially constant, pre-selected value. In this connection, it is to be noted that the broiling of food is effected by the heat received from the heat source by direct radiation rather than by the ambient heat of the broiler oven 10, which, of course, becomes relatively hot after the broiler has been in operation for some time. Accordingly, to regulate the broiling rate, the heat source 13 is placed under control of a pre-settable control device 20, which is operable under control of a heat sensing element 21 positioned to respond substantially only to the temperature in the broiling zone through reflection and convection of heat from the food being broiled.

Since the invention has been shown incorporated in a gas range in which the heat source 13 is the gas burner 14, the control device 20 conveniently comprises a manually settable themostatically controlled valve 25 (Fig. 6) which may be of the type disclosed and claimed in applicant Hillebrand's co-pending application, Serial No. 464,257, filed October 25, 1954, now Patent No. 2,862,667. The manual setting of this valve is effected through the medium of a finger piece 26 (Fig. 2) arranged adjacent and rotatable about a common axis with a knob 27 by which the valve 25 is opened and closed. The temperature sensing element 21 controlling automatic operation of the valve is an elongated metal bulb connected to the valve by a tube 28, both bulb and tube being filled with a suitable heat sensitive fluid.

To enable the controls to respond to the heat intensity in the broiling zone without significant interference by direct radiation from the burner or from the ambient heat of the oven, the heat responsive element or bulb 21 is positioned to receive the major portion of its actuating heat directly from the food being broiled. This involves the mounting of the bulb between the burner 14 and the food supporting rack 15 and the provision of a shield structure 30 effectively shielding the element from the heat radiated from the burner.

Figure 5:
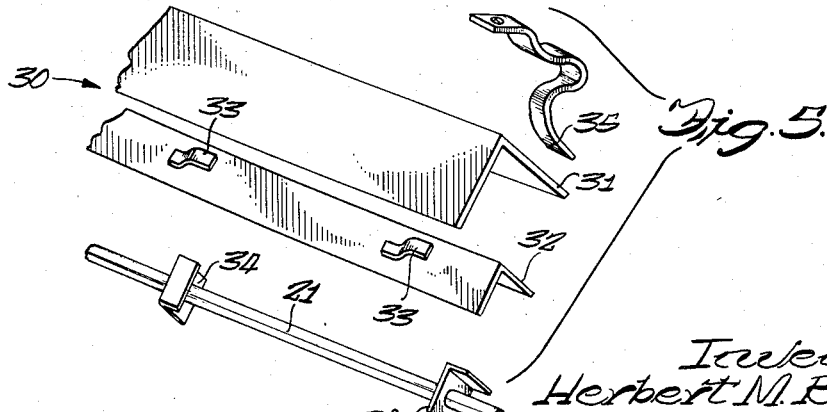
Fig. 5 is an exploded perspective view of the shield structure associated with the temperature sensing element.

The shield structure 30 (Fig. 5) in its preferred form, comprises a pair of elongated angle members 31 and 32 of heat resisting metal or other suitable material. One of the members, in this instance the member 32, is dimensioned to fit within the angle defined by the companion member as shown in Fig. 5. The angle members are accordingly assembled in nested relation and secured together as a rigid unit with substantial spaces between their adjacent legs. For securing the elements together, suitable spacers 33 are welded or otherwise attached to the respective members. Rectangular metal blocks 34 disposed within the angle of the member 32 and welded thereto at their edges are apertured to receive and support the bulb 28 in spaced relation to the legs of the inner member.

In practice, the shield structure 30 is supported below the burner 14 with the angle members 31 and 32 facing downwardly. Support may be provided by a hanger 35 bolted or otherwise attached to the underside of the burner and welded or otherwise suitably anchored to the upper member of the shield structure. With this arrangement, the bulb 28 is located above and parallel to the upper surface of the food supporting rack and is shielded from the radiations of the burner 14 by the members 31 and 32. The air spaces between the two members and between the member 32 and the bulb materially increases the shielding effect and effectively protects the bulb from direct radiation from the burner. Furthermore, its location above but in proximity to the broiling zone in which the food is being cooked, minimizes the effect of the ambient temperature of the oven on the operation of the controls.

Referring more in detail to the specific embodiment of the invention disclosed herein, it will be observed that the burner 14 is a conventional broiler burner with a series of closely-spaced burner ports designed to provide a substantially, continuous flat flame over a substantial area. Suitable brackets 37 and 38 attached to the range structure support the burner in the upper part of the oven. The burner shown is formed with flanges 39 extending over the burner ports and positioned to direct the heat downwardly. Additionally, radiant elements 40 may be mounted above the burner in a position to be heated by the burner flame to amplify the heat radiation on the food being broiled.

The burner 14 shown is formed at one end with a mixing chamber 41 to which gas is supplied from the valve 25 by the way of a tube 42. An air intake in the lower wall of the mixing chamber controlled by a swinging damper element 43 opens into a conduit 44 arranged to supply combustion air to the burner from outside of the oven.

Referring now to Figs. 6, 7, and 8, the control device 20 or valve 25 comprises a body 45 formed with two axially alined chambers 46 and 47. The chamber 46 is connected to receive gas from the manifold 50 of the range by way of a tapered bore 48 and an inlet port 49 suitably connected to the manifold. The flow of gas through the bore 48 into the chamber is controlled by a tapered rotatable valve member or plug 51 seated in the bore. The valve plug has an axial bore opening at one end into the chamber and one or more ports 52 opening radially from the bore. These ports are movable into registration with the port 49 upon rotation of the plug to predetermined angular positions. Rotation of the plug is effective through the medium of the knob 27.

The other chamber 47 in the valve body has an outlet port 52 connected with the burner 14 by way of the supply tube 42. Communication between the chambers 46 and 47 is controlled by a valve disc 53 movable between open and closed positions in accordance with the temperature to which the heat sensing element 21 is subjected. For this purpose, the tube 28 extending from the bulb 21 is connected to a bellows 54 arranged coaxially within the chamber 47. The bellows, in turn, is connected with the disc 53 by means including an adjusting screw 55 threaded into a tubular coupling element 55'. By turning the screw, the spacing of the valve disc from the bellows can be varied to determine the temperature at the bulb 21 required to close the valve.

A coil spring 56' normally urges the valve disc 53 to open position and, as the temperature of the bulb 21 increases, expansion of the fluid therein acts through the bellows to shift the valve disc toward the closed position. Accordingly, the flow of gas through the valve to the burner and consequently the heat output is automatically increased or decreased to maintain a predetermined temperature in the broiling zone of the oven as sensed by the bulb 21.

Adjustment of the controls to select the temperature to be maintained in the broiling zone is effected by varying the spacing of the valve disc with reference to the bellows 54. This is done by turning the finger piece 26 which is attached to the projecting end of a stem 56 extending through the knob 27 and through the valve plug 51 and having an operative connection with the adjusting screw 55. To facilitate selecting of the predetermined temperatures, a suitably graduated scale 58 is desirably provided on the valve structure in concentric relation to the knobs.

Having in mind the constructions as above described, the operation of the improved broiler controls will be readily apparent. Thus the controls may be preset to provide the precise temperature required for the best results according to the particular food to be cooked by appropriately positioning finger piece 27. While this is ordinarily done before the broiling is started, the setting may be changed during the broiling operation, if desired. After setting the controls, burner is started in operation by simply rotating the plug 51 to admit gas to the valve chambers and the burner is ignited in the usual manner.

To prevent the burner from being extinguished when the gas flow is reduced or shut off by the thermally responsive controls, a gas by-pass 59 around the valve disc 53 between the chambers 46 and 47 is provided in the valve body as shown in Fig. 7. Gas flow through this by-pass is controlled by a rotatable valve element 60 which may be set to provide sufficient flow to maintain a low flame even though the valve disc 53 is in fully closed position. An additional gas passage 61 from the chamber 46 controlled by a rotary valve 62 may be provided for supplying gas to a burner pilot light by way of the pilot tube 63.

It will be apparent from the foregoing that the invention greatly facilitates the cooking of food by the process known as broiling. The controls when preset for a particular temperature regulate the output of the heat source to establish and maintain precisely that temperature in the broiling zone. Since the controls respond to the heat radiated from the food itself, the spacing of the food from the heat source becomes relatively unimportant. Proper broiling conditions for any food can thus be established by following simple instructions furnished with the range.

The controls provided by the invention also perform an important function in protecting the broiler against overheating in case the cook forgets to turn off the burner after the food is removed from the oven. In that case, the temperature sensing element responds to overtemperature and regulates the burner so that the set temperature is not exceeded. The controls are simple in construction and can be manufactured and assembled at relatively low cost. Moreover, standard, commercially available heat responsive elements are utilized which results in further savings. The controls provided by the invention are further characterized by their ruggedness, their dependable, accurate operation and by their ability to function for long periods with a minimum of attention in the way of care or maintenance.

We claim:

1. In a broiling oven, in combination, an adjustable food support in the lower part of the oven, a gas burner in the upper part of the oven over the food support and positioned to radiate the heat downwardly on food carried by said support, valve means controlling the supply of gas to said burner, thermally responsive means for operating said valve to vary the gas supply to said burner, said thermally responsive means including a heat sensing element and manually operable adjusting means for selectably determining the temperature to be maintained at said element, means supporting said element in the oven in spaced relation to the food being broiled, and a shield structure mounted adjacent said element in a position to effectively shield the element from direct heat radiation from said burner, said shield structure comprising a pair of members assembled in nested relation with an air space between them and with an air space between the inner member and said element to minimize heat transfer from the burner to the element, said pair of members being physically interposed directly between the burner and the element and in substantial vertical alignment therewith.

2. In a broiler, in combination, means supporting food to be broiled, a heat source spaced from said supporting means and positioned to radiate heat on the food supported thereon, control means for regulating the heat output of said source including an elongated heat sensing element interposed between said heat source and the food being broiled, said element extending transversely across the food support and being positioned to receive heat by radiation and convection from the food, and a shield interposed between said element and said burner comprising a pair of elongated members of V-shaped cross section assembled in nested relation with a substantial air space between their respective legs, means carried by the inner member for supporting said element in spaced relation to the legs of that member, and means supporting the shield assembly with both members interposed between the element and the heat source.

3. In a broiler, in combination, means supporting foods to be broiled, a heat source spaced from said supporting means and positioned to radiate heat on the food supported thereon, control means for regulating the heat output of said source including an elongated heat sensing element positioned between the heat source and the food to receive heat by radiation and convection from the food, and means for shielding the element from direct radiation from said heat source including a pair of elongated members of generally concave cross-sections assembled in nested relation with substantial air spaces between them, means carried by the inner member for supporting said element, and means for supporting the assembled members so that both are interposed between the element and said heat source.

References Cited in the file of this patent

UNITED STATES PATENTS

| 1,702,854 | Simonds | Feb. 19, 1929 |
| 2,275,265 | Mead | Mar. 3, 1942 |
| 2,459,169 | Koci | Jan. 18, 1949 |
| 2,463,712 | Newell | Mar. 8, 1949 |
| 2,476,067 | Sherman | July 12, 1949 |

OTHER REFERENCES

Shoemaker, page 137 of "Radiant Heating" by R. W. Shoemaker, first edition, published 1948 by the McGraw-Hill Co. TH7463S4.